April 21, 1970

F. JACUZZI 3,507,753

WATER PURIFIER OF THE CONDENSER TYPE

Filed Aug. 22, 1968

INVENTOR.
FRANK JACUZZI

BY Edward Brosler

ATTORNEY

United States Patent Office 3,507,753
Patented Apr. 21, 1970

3,507,753
WATER PURIFIER OF THE CONDENSER TYPE
Frank Jacuzzi, Berkeley, Calif., assignor to Jacuzzi Bros. Incorporated, a corporation of California
Filed Aug. 22, 1968, Ser. No. 754,615
Int. Cl. B01d 3/42, 5/00
U.S. Cl. 202—191                 1 Claim

ABSTRACT OF THE DISCLOSURE

A water purifier and condenser in which vent means are provided for separating mal-odorous gasses from the water while in its vaporized condition. The unit involves a novel float controlled valve assembly for automatically controlling admission of raw water to be purified, and utilizes the heat absorbing ability thereof in the condensing process, by bringing it into contact with the condensing surface of the unit.

---

Figures 1, 2, 3:
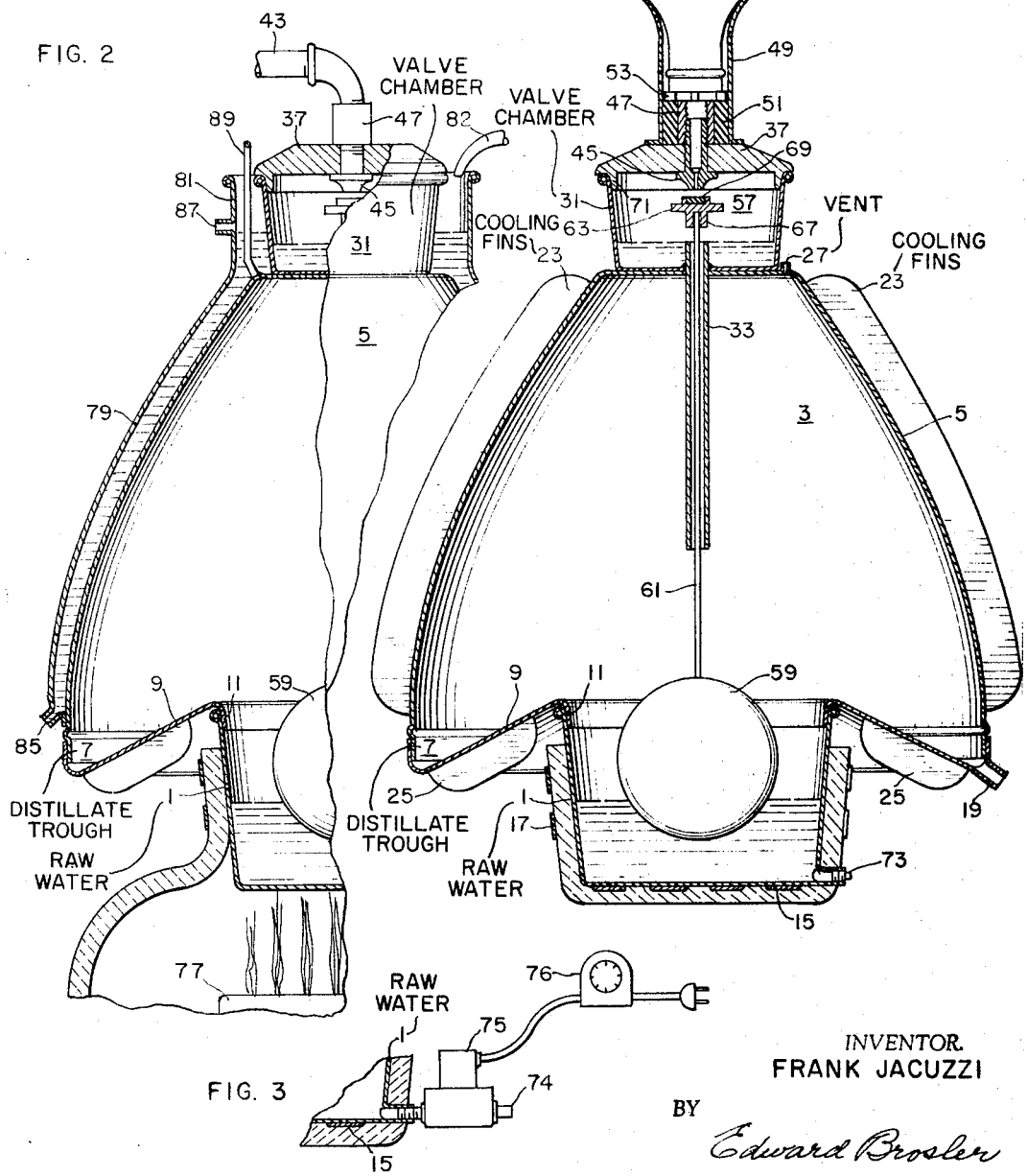

My invention relates to water purifiers and more particularly to one of the type involving evaporation and condensation of the liquid to be purified.

Units for purification of liquids by the process of evaporation and condensation are basically not new. In so far as I am aware, however, any mal-odorous gasses present in the water to be purified were carried over into the condensate where their presence adversely affected the taste of the water.

Among the objects of my invention are:

(1) To provide in a water purifier of the condenser type, novel and improved means for separating mal-odorous gasses from the water being evaporated, to avoid the same being carried over into the condensate;

(2) To provide a novel and improved water purifier of the condenser type in which mal-odorous gasses in the water to be purified, are removed in an extremely simple and effective manner, while the water being purified is in the vapor stage;

(3) To provide a novel and improved water purifier of the condenser type, in which the raw water to be purified is added at a rate commensurate with the rate of purification;

(4) To provide a novel and improved water purifier of the condenser type in which the raw water being added, is utilized in the process of condensing water in its vapor state; and (5) To provide a novel and improved water purifier of the condenser type, capable of being cleaned by drain-washing the same.

Additional objects of my invention will be brought out in the following description of a preferred form of the same, taken in conjunction with the accompanying drawings, wherein FIGURE 1 is a view in section through a water purifier of the condenser type embodying the present invention;

FIGURE 2 is a fragmentary view in section depicting a modification of the water purifier of FIGURE 1; and FIGURE 3 is a fragmentary view depicting an automatic cleaning feature.

Referring to the drawings for details of my invention, the same involves a receptacle 1 for holding raw water to be purified, and on this is supported a vapor condensing chamber 3 with access thereto for vapors rising from the receptacle 1.

The vapor condensing chamber may involve a bell or dome shape component 5 having downwardly sloping wall surfaces and connecting at the lower edge thereof with an internal circular trough 7 having an inner wall 9 terminating in a lip 11 adapted to fit into the open end of the receptacle to support the vapor condensing chamber thereon.

Heat applied to the water in the receptacle to hasten evaporation thereof, may take the form of an electrical heating element 15 applied to the outer surfaces of the receptacle and held thereon by bands 17.

Vapor thus released will rise into the vapor condensing chamber where, upon striking the cooler wall surfaces thereof, will condense and coalesce, and ultimately flow downwardly into the trough, from which it may be withdrawn through a spout 19.

To effect cooling of the chamber wall surfaces, a plurality of cooling fins 23 may be applied to the outer surface of the bell shape component, and to the outer surface of the inner wall 9 of the trough, additional fins 25 may be added. If the condensing chamber is of metal, the fins will likewise be of metal and preferably welded into position.

One of the important features of the present invention resides in the provision of means for enabling one to obtain a condensate substantially free of any mal-odorous gases originally present in the raw water, rather than have to subsequently attempt to remove such gases from the condensate. I have found that this can be very effectively accomplished, and in a most simple manner, merely by providing a vent 27 in the vapor condensing chamber at a high point therein, to facilitate and encourage separation of such gases from the vapor.

The receptacle 1 may be filled periodically by first removing the vapor condensing chamber from the receptacle, but I prefer to supply such water automatically as needed, and another feature of the present invention resides in a particular valve control arrangement for doing this.

Such valve control arrangement involves a valve chamber 31 resting on the upper end of the bell shape component of the vapor condensing chamber, with a flow communication tube 33 extending from a point above the bottom of the valve chamber, down through the bottom of the valve chamber and the upper end of the bell shape component, and terminating at a relatively low point within the vapor condensing chamber. For the purpose of simplifying the assembling and disassembling of the purifier unit, the flow coupling tube is preferably welded to the bottom of the valve chamber and is adapted to slidably fit through a hole in the upper end of the vapor condensing chamber. The bottom area of the valve chamber is preferably somewhat less than that of the upper end of the vapor condensing chamber, to leave room for the vent 27.

The valve chamber is of cup shape and fitted at its upper end with a cover 37, which has installed therein, a fitting assembly providing for flow communication therethrough into the valve chamber from an external source of supply of raw water, such fitting assembly being so designed as to enable such external source of supply to be either in the form of an inverted bottle 41 of raw water or a pipe 43 connected to a remotely located reservoir.

Such fitting assembly includes a nozzle 45 inserted through the cover from below, with its exposed upper end externally threaded to receive an internally threaded pipe coupling 47. When to be used in connection with a remote source of supply, such as a large tank or a water pressure system (not shown), a pipe connection 43 to the pipe coupling is all that is necessary.

On the other hand, if the purifier is to be supplied from the bottle 41, a bottle support funnel 49 is positioned on the cover about the pipe coupling 47 and sealed thereto by a rubber seal 51. A vent and bottle support 53 is then positioned on the seal. The bottle when inverted into the funnel will rest on the bottle support element.

To conform the rate of flow from the bottle or other reservoir as the case may be, to the rate at which water is evaporated from the receptacle, so as to prevent overflow of raw water into the collecting trough, a valve assembly 57 is introduced into the valve chamber under control of a float 59 in the receptacle. The float, preferably in the form of a ball, is provided with a float rod 61 extending upwardly through the flow coupling tube 33 as a guide, and up into the valve chamber, carries at its upper end, a valve 63 adapted to engage the nozzle 45 functioning as a valve seat, to block flow of water into the valve chamber, when the level of water in the receptacle reaches a predetermined height below the overflow level.

The valve is provided with a hollow valve stem 67 adapted to slidably fit over the upper end of the float rod, to permit of its removal and thus facilitate the assembling and disassembling of the entire unit.

Structurally, the valve includes a rubber disc insert 69 for effective valve action, the overall area of the valve being such as to cause spreading of the inflowing liquid toward the walls of the valve chamber, to thereby preclude direct flow from the nozzle into the flow coupling tube. Because this tube extends into the valve chamber to a point above the bottom thereof, the incoming water must accumulate to this level before it can overflow into the flow coupling tube and drop into the receptacle below.

This arrangement introduces a novel function, in that the incoming water which would naturally be of a lower temperature than the prevailing temperature within the vapor condensing chamber, will serve to assist in the vapor condensation process, in the course of which, the water will absorb heat from such vapor, thus entering the receptacle below in a pre-warmed condition to hasten the evaporation process taking place in such receptacle, while at the same time effecting economy in the operation of the unit.

Should the water be entering under pressure, as from a pressure supply source, it would have a tendency to splash, upon striking the valve surface, and to preclude leakage where the cover rests on the valve chamber wall, the cover is formed with a depending internal flange 71.

With the unit dry, the float will of course rest on the bottom of the receptacle, and as the receptacle receives water from above, the float will rise with the liquid level in the receptacle until the valve engages the nozzle and shuts off the flow of incoming liquid. At this point, the valve may be exerting substantial pressure against the nozzle, and to avoid any probability of the cover being lifted from the valve chamber, as when not weighted down by a bottle, the cover may be formed of a heavy metal such as lead.

Upon application of heat to the receptacle, vaporization of the water therefrom, will gradually cause a lowering of the float with an ultimate opening of the valve sufficiently to admit water from the supply source to restore the liquid level in the receptacle and bring the valve back to its closing position. Thus during operation of the unit, the valve will hover about its closed position in maintaining liquid level in the receptacle.

The vapors arising from the receptacle will, upon striking the cooler wall surfaces of the vapor condensing chamber, condense thereon while any mal-odorous gases arising with the vapor, will have an opportunity to separate and escape from the vapor condensing chamber through the vent into the surrounding atmosphere. The water thus collecting in the trough, will be of good taste and devoid of bad odors.

Following a period of operation, and particularly if the raw water contains salt, as when the source of supply may be the ocean, salts and other residues may collect within the receptacle, thus necessitating a periodic cleaning out. Ordinarily, this would necessitate dismantling the unit to gain access to such receptacle for cleaning purposes.

As a means of avoiding this, I provide for washing the unit by installing a removable drain plug 73 in the receptacle wall at floor level. By removing such plug during operation and before the water becomes saturated with salt, and permitting the water from the supply source to flow through the unit instead of collecting in the receptacle, water in the receptacle carrying a heavy concentration of salt, will drain out before such salts will deposit out over the bottom and walls of the receptacle, and make cleaning a more difficult task.

This cleaning or washing operation may be made to be automatic, by substituting for the drain plug 73, a drain line 74, having a normally closed solenoid valve assembly 75 under control of a timer 76. The setting of the timer will depend on the nature of the raw water, and will be set to open the valve at some time before saturation of the water in the receptacle can occur, and hold the valve open until incoming water substantially replaces the near saturated contents of the receptacle.

While electrical heating has been disclosed in the embodiment thus far described, it will be apparent that other sources of heat may be utilized such as open flame gas heat 77 (FIGURE 2).

The use of fins for cooling purposes provides for air cooling and is convenient and to be preferred in small and medium size units, though in lieu thereof, I contemplate use of a water jacket 79 (FIGURE 2) enclosing the bell shape component of the vapor condensing chamber and, at its upper end, terminating in a collar 81 surrounding the valve chamber. When resorting to a water jacket, cooling water may be supplied through a hose or pipe 82 at the upper end of the collar, and a drain opening 85 will be provided at a low point of the water jacket.

To assure against overflow of the water in the water jacket, an overflow outlet 87 having means for connection of a discharge tube, is provided in the collar portion at a location below the upper rim of the collar 81.

In this water jacket embodiment, the vent may take the form of a tube 89 extending upwardly between the collar and the valve chamber.

The units described above are primarily for household or laboratory use. It is contemplated, however, that the present invention is applicable to installations of substantial size, of the order of fifty feet or more in diameter, relying on air cooling without fins. In such installations, the heating unit and receptacle may be quite small, of the order of two feet in diameter, for example. An installation of this size could supply a small group or community with adequate water of good and safe drinking quality.

From the description of my invention, it will be apparent that the same fulfills all the objects attributed thereto, and while I have illustrated and described the same in considerable detail, the invention is subject to alteration and modification without departing from the underlying principles involved, and I, accordingly, do not desire to be limited in my protection to the specific details illustrated and described, except as may be necessitated by the appended claim.

I claim:
1. A water purifier of the condenser type comprising:
a receptacle for holding water to be purified,
a vapor condensing chamber supported about said receptacle with access thereto for vapors arising from said receptacle, said vapor condensing chamber having downwardly sloping wall surfaces terminating in means for collecting and removing condensate,
means for cooling the wall surfaces of said chamber to effect condensation thereon of water vapor entering said chamber from said receptacle,
vent means at the upper end of said condensing chamber for releasing mal-odorous gases arising in said chamber with said vapor, to effect a separation of said gases from said vapor and enable condensation of said water vapor without absorption of such gasses, a cup shaped valve chamber supported above said vapor condensation chamber, a flow communicating tube extending downwardly from a point above the bottom of said valve chamber and approaching said receptacle whereby to flow connect said valve chamber with said receptacle, means for flow connecting a source of supply of impure water to said valve chamber and for flow of the impure water downwardly through said tube to said receptacle, said flow connecting means including a fitting having a flow passageway into said valve chamber, float actuated means for shutting off flow from such source of supply to said valve chamber when the impure water in said receptacle reaches a predetermined level, a drain line from said receptacle, a normally closed solenoid drain valve assembly in said drain line, and timing means adapted to energize said solenoid to open the drain valve before saturation of the water in the receptacle occurs and hold it open for a time period sufficient to permit draining and replacement of the contents of said receptacle.

References Cited

UNITED STATES PATENTS

| | | | |
|---|---|---|---|
| 491,028 | 1/1893 | Thomas et al. | 202—191 |
| 496,488 | 5/1893 | Ruud | 202—193 X |
| 587,162 | 7/1897 | Rosebrook | 202—193 |
| 790,901 | 5/1905 | Keith | 202—193 |
| 798,901 | 9/1905 | Hodges | 202—190 |
| 1,635,112 | 7/1927 | Carlson et al. | 202—196 |

NORMAN YUDKOFF, Primary Examiner

F. E. DRUMMOND, Assistant Examiner

U.S. Cl. X.R.

202—191, 193; 203—10